(12) United States Patent
Carroni et al.

(10) Patent No.: US 7,594,394 B2
(45) Date of Patent: Sep. 29, 2009

(54) CATALYTIC REACTOR AND METHOD FOR THE COMBUSTION OF FUEL-AIR MIXTURES BY MEANS OF A CATALYTIC REACTOR

(75) Inventors: Richard Carroni, Niederrohrdorf (CH); Timothy Griffin, Ennetbaden (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 11/528,258

(22) Filed: Sep. 28, 2006

(65) Prior Publication Data

US 2007/0054226 A1 Mar. 8, 2007

Related U.S. Application Data

(63) Continuation of application No. PCT/EP2005/051361, filed on Mar. 23, 2005.

(30) Foreign Application Priority Data

Mar. 31, 2004 (CH) .................................... 0554/04

(51) Int. Cl.
*F01N 3/00* (2006.01)
(52) U.S. Cl. .......................................... 60/299; 60/274
(58) Field of Classification Search .................... 60/274, 60/285, 298, 299
See application file for complete search history.

(56) References Cited

U.S. PATENT DOCUMENTS

| 5,758,493 A * | 6/1998 | Asik et al. ..................... 60/274 |
| 2002/0197578 A1 | 12/2002 | Smith et al. |
| 2006/0080968 A1* | 4/2006 | Griffin et al. ................... 60/777 |

FOREIGN PATENT DOCUMENTS

| WO | WO 02/092212 A2 | 11/2002 |
| WO | WO 03/033985 A1 | 4/2003 |
| WO | WO 2004/020905 A1 | 3/2004 |

* cited by examiner

*Primary Examiner*—Thomas E Denion
*Assistant Examiner*—Diem Tran
(74) *Attorney, Agent, or Firm*—Buchanan Ingersoll & Rooney PC

(57) ABSTRACT

In a catalytic reactor for the burning of at least part of fuel-air mixtures flowing through the catalytic reactor, the catalytic reactor has a plurality of passages. The catalytic reactor is charged with lean fuel-air mixtures and rich fuel-air mixture. The catalytic reactor includes at least two sections (I,II,II). A first flow-washed section (I) is free of catalytic coatings and a catalytic coating is located in a downstream-lying second section (II) in the passages through which flows the rich fuel-air mixture.

18 Claims, 2 Drawing Sheets

CATALYTIC REACTOR AND METHOD FOR THE COMBUSTION OF FUEL-AIR MIXTURES BY MEANS OF A CATALYTIC REACTOR

RELATED APPLICATIONS

This application is based on and claims priority under 35 U.S.C. §119 to Swiss Application No. 00554/04, filed Mar. 31, 2004 and is a continuation application under 35 U.S.C. §120 of International Application No. PCT/EP2005/051361, filed Mar. 23, 2005 designating the U.S., the entire contents of both of which are hereby incorporated by reference.

FIELD

A catalytic reactor and a method for the combustion of fuel-air mixtures by a catalytic reactor are disclosed.

BACKGROUND

In power generating plants, especially gas turbines, catalytic reactors, or catalyzers for short, are used to burn a part of the gaseous fuel and air mixture flowing through the catalyzer. Because of this, a temperature increase arises in the gas-air mixture, and depending upon the catalytic reactor a synthesis gas substantially comprising a mixture of hydrogen gas ($H_2$) and carbon monoxide (CO) can also be produced. The hot exhaust gas serves for the thermal and/or chemical stabilization of the homogenous flame in the combustion chamber. An aerodynamic flame stabilization is frequently necessary as, for example, through a sudden cross-sectional enlargement between the catalyzer and the homogenous flame front in the combustion chamber.

The pollutant emission of nitrogen oxides (NOx) and carbon monoxides (CO) can be significantly reduced by the catalytic combustion of fuel-air mixtures. The reason for this reduction is the carbon dioxide ($CO_2$) and water ($H_2O$) present in the exhaust gas of the catalyzer which delay the formation rate of thermally formed nitrogen oxides (NOx) in the homogenous flame front. Therefore, less nitrogen oxide is formed, even at high temperatures above 1450° C. Furthermore, the catalyzers use a thoroughly-mixed fuel-air mixture to avoid a local overheating. As result of this, the homogenous flame mixture is more uniform and local hot spots are avoided which would have promoted the forming of NOx. The direct forming of NOx is also reduced through the smaller hydrocarbon concentrations (CH-concentration) after the catalytic reactor.

The extinction limits for lean flames can also be extended by the chemical stabilization. In particular, hydrogen gas, and up to a certain point also carbon monoxide, have been used for this purpose. With atmospheric burners in gas turbines it was proven that by the substitution of small portions of the gaseous fuel with hydrogen gas the extinction limits could be substantially extended. It is still more advantageous to locally inject the hydrogen gas, whereby less $H_2$ is required than with the premixing with fuel and without the NOx emissions being increased as is the case in the event of poor premixing.

For flame stabilization with catalyzers methods of lean premix combustion are known during which a lean fuel-air mixture is completely oxidized (Full oxidation=FOX) in the catalyzer. With such systems the combustion air and almost all the fuel is routed through the catalyzer. Such systems are prone to fuel-air fluctuations and inhomogeneities and also to a deactivation of the catalyzers. With larger combustion systems a part of the fuel must be bypassed around the catalyzer. The injecting of this fuel after the catalyzer and the admixing can be problematic and can lead to unwanted pollutant emissions.

For flame stabilization with catalyzers methods of rich combustion are also known, in which a rich fuel-air mixture is used. The rich fuel-air mixture is only partially burnt in the catalyzer (Partial oxidation=POX). With these methods, all the fuel is usually directed through the catalyzer. A flame extinction takes place at significantly lower temperatures than with lean mixtures, and the stability and robustness of the catalyzer can be increased considerably. With these systems, however, a large portion of the combustion air can be bypassed around the catalyzer and fed to the exhaust gas after the catalyzer. During this admixing unwanted pollutant emissions and temperature irregularities may occur, especially at high temperatures as are encountered in large combustion systems.

SUMMARY

A catalytic reactor and associated method are disclosed which can reduce pollutant emissions and enable a high flame stability.

An exemplary catalytic reactor is charged with lean fuel-air mixtures and rich fuel-air mixtures. The catalytic reactor comprises at least two sections. A first flow-washed section is free of catalytic coatings, and a catalytic coating is located in a downstream-lying second section in the passages through which flows the rich fuel-air mixture.

Exemplary advantages include the catalytic fuel conversion being maximized by the catalyzer. Pollutant emissions are thereby reduced in all operating states, with nitrogen oxides being reduced by the presence of water and carbon dioxide, and carbon monoxides are reduced by the improved chemical flame stabilization. Moreover, the flame stability can be increased under all operating conditions. Even the light-off performance of the catalyzer can be improved as especially the rich fuel-air mixtures are preheated more intensely. The required length of the catalyzer can be shortened, and the cooling of the catalytic coatings (especially the catalytic coating for the lean combustion) and the control of the temperatures in the catalyzer can be improved. The control of the throughflow rates of air and fuel through the various passages, and therefore the accurate control of the air-fuel mixtures allows a high flexibility during operation. Furthermore, a stable combustion is always guaranteed. In addition, an admixing of fuel after the catalyzer, as with lean fuel-air systems (FOX), and the admixing of combustion air after the catalyzer, as used with rich fuel-air systems (POX), is no longer necessary, as a consequence of which disadvantages of the state of the art can be avoided.

BRIEF DESCRIPTION OF THE DRAWING

Hereinafter, exemplary embodiments are explained more clearly. Like elements are provided with the same reference designations in the different figures. The flow direction of the media is identified by arrows. Only elements essential for the direct understanding are shown. Not shown are plant elements such as the fuel supplies, and the compressor and the turbine.

In the drawings.

DETAILED DESCRIPTION

Figure 1:
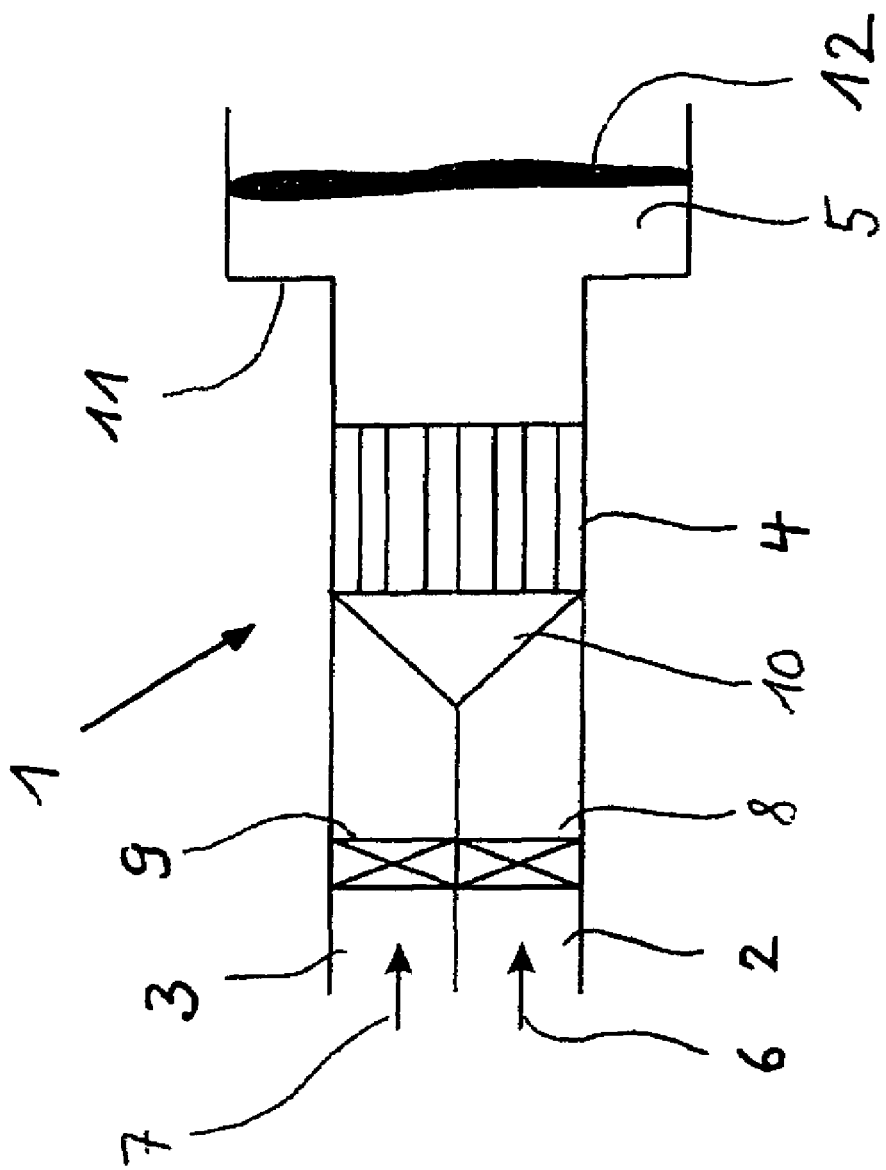
FIG. 1 shows a schematic partial longitudinal section through an exemplary burner assembly.

In FIG. 1 is a burner assembly 1, for a power generating plant, for example, comprising a first feed line 2 and a second feed line 3, a catalytic reactor 4, also known as a catalyzer, and a downstream-lying combustion chamber 5. A lean air-fuel mixture 6 with an air ratio $\lambda > 1.0$ is fed via the feed line 2 to the catalyzer 4 and can be completely oxidised there (Full oxidation=FOX). The air ratio A lies, for example, preferably within the range of 1.5 to 3.0, or other suitable range.

A rich fuel-air mixture 7 with an air ratio $\lambda < 1$ is fed via the feed line 3 to the catalyzer 4 and usually only partially oxidised there (Partial oxidation=POX). The air ratio A here lies, for example, preferably within a range of 0.15 to 0.6, or other suitable range.

Upstream of the air feed lines 2 and 3 fuel is added to the combustion air. Mixing devices (8,9) can be installed in the air feed lines for the further intermixing of the fuel-air mixture. The mixing of air and fuel can, however, take place even upstream by known mixing systems. Both fuel-air mixtures 6, 7 now encounter a distribution device 10, which distributes the fuel-air mixtures to the catalyzer 4. A catalytic combustion of the fuel-air mixtures takes place in the catalyzer and these mixtures then downstream enter the combustion chamber 5 via an abrupt cross-sectional enlargement 11. Through the cross-sectional enlargement a stable recirculation zone is formed which additionally stabilizes a homogenous flame front 12.

Figure 2:
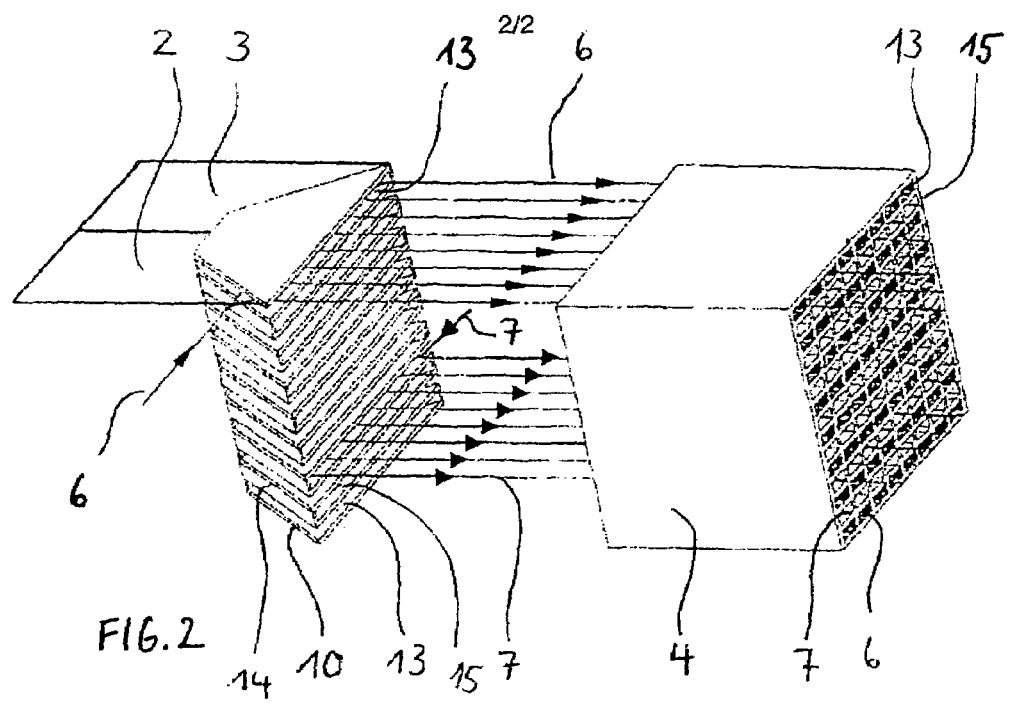
FIG. 2 shows a schematic plan view of a catalyzer.

In FIG. 2 the distribution device 10 and the catalyzer 4 are shown in more detail. Such distribution devices 10 and catalyzers 4 are known, for example, from WO 03/033985 A1, the content of which is incorporated herein by reference in its entirety. In the embodiment shown in FIG. 2 the distribution device 10 comprises parallel extending walls and cross-struts which thus form parallel extending passages 13 and 15. These passages are then closed alternately to the only schematically represented feed lines 2 and 3 via restrictors 14 so that the lean fuel-air mixture 6 and the rich fuel-air mixture 7 can each enter the respective passages 13 and 15 alternately. The catalyzer is likewise divided into parallel passages analogous to the distribution device so that the lean fuel-air mixture 6 can enter the passages 13 and the rich air-fuel mixture can enter the passages 15. The parallel passages 13 and 15 are arranged in alternating fashion and lead through the catalyzer. Therefore, a wall of a passage 15 which carries a rich air-fuel mixture 7 can form a wall of a passage 13 which carries a lean fuel-air mixture. In this way, thermal energies of the different fuel-air mixtures are exchanged. Other designs or configurations for the distribution device 10 and the catalyzer 4 similar to WO 03/033985 can also be used.

Figure 3:
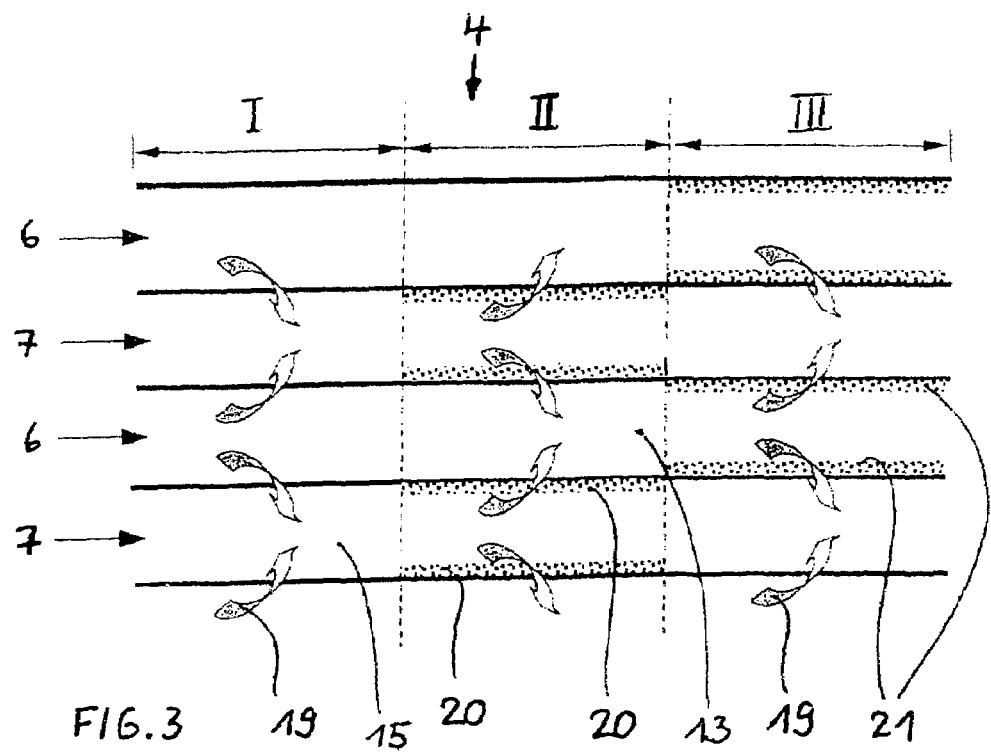
FIG. 3 shows a schematic partial longitudinal section through an exemplary catalyzer.

In FIG. 3 the passages 13,15 of the catalyzer are shown in detail, the arrows indicating the thermal flux 19. In a first section 1, the rich fuel-air mixture 7 is preheated and further heated. As a result of the high fuel concentration in this flow the temperature of the rich mixture is significantly lower than the temperature in the lean fuel-air mixture 6. This is on account of the temperature of the fuel supplied which is between, for example, 20 and 100° C., or other suitable range. The lean mixture has a higher temperature and so heats up the rich mixture.

In a subsequent second sections II, catalytic coatings 20 are applied mainly in the passages 15 through which flow the rich fuel-air mixture 7. These coatings 20 include (e.g., consist preferably of) rhodium catalyst materials, such as $Rh/ZrO_2$.

The preheated rich fuel-air mixture 7 is ignited and burnt, partially in a fuel rich environment (POX). The first stage during such a reaction is always very much exothermal. The nascent heat is transmitted through the passage walls into the adjacent passages 13 carrying a lean fuel-air mixture 6 and the temperature of this lean fuel-air mixture 6 is increased greatly.

In a subsequent third section III, catalytic coatings 21 are applied mainly in the passages 13 through which flow the lean fuel-air mixture 6. These coatings 21 include (e.g., consist preferably of) palladium catalyst materials, such as $Pd/Al_2O_3$, or even platinum catalyst materials. The preheated lean fuel-air mixture 6 reacts heterogeneously with heat generation (FOX) and results in a thermal flux in the direction of the passages 15 through which flows rich fuel-air mixture 7.

Through the exchange of heat between the rich and lean mixtures in the second II and third III sections it is ensured that the catalytic coatings 20, 21 are maintained at operating temperature and do not overheat or lie below the minimum required temperature or so-called light-off temperature. Typical passage diameters lie in a range of 0.5 to 2 mm. Consequently, it is ensured that the homogenous ignition of the mixtures emerging from the catalyzer does not take place in the proximity of the passage outlets. The passages 13 for the lean fuel-air mixture 6 and the passages 15 for the rich fuel-air mixture 7 do not have to have the same diameter and the coated sections II, III similarly do not have to have the same length. Furthermore, sections II and III can overlap, depending upon the desired output.

The residence time of the rich fuel-air mixture 7 in the sections II can be adjusted according to the desired products. If the contact time is sufficiently short the reaction is then predominantly exothermal and the products of combustion predominantly comprise of $H_2O$ and $CO_2$ as the main reaction is $CH_4 + 2O_2 \rightarrow CO_2 + 2H_2O$, and little or even no synthesis gas ensues. In this case, sections II and III ought not overlap as otherwise both coatings 20,21 overheat. A longer contact time promotes the endothermal, fuel-converting reaction which takes place directly after the exothermal stage, by which synthesis gas is produced. In this case, sections II and III should overlap as the exothermal reaction of the lean air-fuel mixture in section III provides the energy for the endothermal, fuel-converting reaction in the last part of sections II. In this way, it is guaranteed that the catalytic coatings are sufficiently cooled. The overlapping can therefore, be selected so that the region of the sections II where the endothermal, fuel-converting reaction takes place is overlapped by the section III with catalytic coatings 21.

Naturally, the catalyzer can also be used similar to a pilot burner with high fuel contents. In this case, the section III can be omitted. The passages for the lean air-fuel mixture are indeed available but not catalytically coated. A coating can be applied which prevents an ignition of the lean air-fuel mixture, such as $Al_2O_3$ or other metal oxides.

The apportioning of the airflow to the two feed lines 2 and 3 can be constant or variable.

If the apportioning is constant, which does not imply that the portions of the air in the feed lines 2 and 3 are equal, the apportioning of the fuel can be varied. By this, the ratio of air to fuel of the two flows 6 and 7 can be altered. Therefore, the respective air ratio A of the two flows can be adjusted to the conditions of the plant and to the operating conditions. For example, at low inlet temperatures more fuel can be fed to the rich fuel-air mixture, therefore the catalyzer lights off (POX light-off).

As a further possibility, the apportioning of the amounts of the whole air flow to the two flows 6 and 7 can be altered. In this case, at low inlet temperatures the throughflow rate of the rich air-fuel mixture 7 could be significantly reduced, therefore the catalyzer lights off, and at higher inlet temperatures the fuel and airflow could then be increased.

At the outlet of section III different geometries can be used. In the simplest case, the end of section III is the end of the catalyzer. As a result of the passages 13, 15 for the lean and rich mixtures lying close together a very good mixing-through between all flows ensues. Consequently, a uniform mixing of the high-temperature lean FOX- and rich POX-mixtures ensues before the homogenous combustion. This can prevent a formation of nitrogen oxides and support a high uniform homogenous combustion. A flow divider can also be installed at the end of the section III which prevents a mixing of FOX- and POX-mixtures. By this, the rich POX-mixture 7 can be locally fed especially to places where through it a chemical stabilization of the homogenous flame can be achieved.

Using the catalyzer, the catalytic fuel conversion is thereby maximized, emissions can be reduced during all operating states, and the flame stability can be increased under all conditions. Moreover, the light-off performance of the catalyzer can be improved, the required length of the catalyzer can be shortened, and the cooling of the catalytic coatings and the control of the temperatures can be improved. The control of the throughflow rates of air and fuel through the various passages, and therefore the accurate control by way of the air-fuel mixtures, allows a high flexibility during operation. In addition, a stable combustion can be always guaranteed.

Naturally, the invention is not limited to the displayed and described exemplary embodiments. It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Burner assembly
2 Feed line
3 Feed line
4 Catalyzer
5 Combustion chamber
6 Lean air-fuel mixture
7 Rich air-fuel mixture
8 Mixing device
9 Mixing device
10 Distribution device
11 Cross-sectional enlargement
12 Homogenous flame front
13 Lean mixture passage
14 Restrictor
15 Rich mixture passage
19 Thermal flux
20 Catalytic coating
21 Catalytic coating
$\lambda$ Air ratio
I First section
II Second section
III Third section

The invention claimed is:

1. A catalytic reactor for the combustion of at least a part of a fuel-air mixture flowing through the catalytic reactor, the catalytic reactor comprising:
   lean fuel-air mixture passages adapted to be in fluid communication with a source of lean fuel-air mixtures, and rich fuel-air mixture passages adapted to be in fluid communication with a source of rich fuel-air mixtures;
   the lean fuel-air mixture passages and the rich fuel-air mixture passages comprising a first flow-washed flow section free of catalytic coating and a second section downstream from the first section, the second section of the rich fuel-air mixture passages comprising a catalytic coating.

2. The catalytic reactor as claimed in claim 1, wherein:
   the lean fuel-air mixture passages and the rich fuel-air mixture passages are located adjacent to one another.

3. The catalytic reactor as claimed in claim 1, wherein:
   the catalytic coating in one passage is located on a wall adjoining an adjacent passage, wherein the adjacent passage carries a different fuel-air mixture.

4. A power generating plant, in combination with a catalytic reactor as claimed in claim 1.

5. The power generating plant as claimed in claim 4, further comprising:
   a distribution device for distribution of the lean and rich fuel-air mixtures flows to the passages is located before the catalytic reactor.

6. The power generating plant as claimed in claim 4, further comprising:
   a combustion chamber installed downstream of the catalytic reactor.

7. A method for the combustion of a fuel-air mixture using a catalytic reactor, the method comprising:
   providing at least one lean fuel-air mixture flow having a first temperature and a rich fuel-air mixture flow having a second temperature, the first temperature greater than the second temperature;
   directing the lean fuel-air mixture and the rich fuel-air mixture through passages in the reactor, the passages comprising a first section and a second section;
   transferring thermal energy from the lean fuel-air mixture to the rich fuel-air mixture in the first section; and
   transferring thermal energy from the rich fuel-air mixture flow to the lean fuel-air mixture flow in the second section.

8. The method as claimed in claim 7, wherein: the air ratio of the lean fuel-air mixture flow and of the rich fuel-air mixture flow is adjusted.

9. The method as claimed in claim 7, wherein:
   the passages comprise a third section; and
   transferring thermal energy from the lean fuel-air mixture flow to the rich fuel-air mixture flow in the third section.

10. The method as claimed in claim 9, further comprising:
   causing an endothermal reaction of the rich fuel-air mixture flow in the second section, and releasing thermal energy to the lean fuel-air mixture flow, and wherein the second section and the third section at least partially overlap.

11. The method as claimed in claim 10, wherein:
   the air ratio of the lean fuel-air mixture flow and of the rich fuel-air mixture flow is adjusted.

12. A catalytic reactor for the combustion of at least a part of a fuel-air mixture flowing through the catalytic reactor, the catalytic reactor comprising:
   passages adapted to be in fluid communication with a source of lean fuel-air mixtures and through which flow the lean fuel-air mixtures, and passages adapted to be in fluid communication with a source of rich fuel-air mixtures and through which the flow rich fuel-air mixtures;

a first flow-washed flow section (I) free of catalytic coatings;

a catalytic coating located in a downstream-lying second section (II) in the passages through which flow the rich fuel-air mixtures; and a third section (III) is located downstream of the second section, a catalytic coating being located in the third section (III) in the passages through which flow the lean fuel-air mixtures.

13. The catalytic reactor as claimed in claim 12, wherein: the second section and the third section overlap.

14. The catalytic reactor as claimed in claim 13, wherein: the lean fuel-air mixture passages and the rich fuel-air mixture passages are located adjacent to one another.

15. The catalytic reactor as claimed in claim 14, wherein: the catalytic coating in one passage is located on a wall adjoining an adjacent passage, wherein the adjacent passage carries a different fuel-air mixture.

16. A power generating plant, in combination with a catalytic reactor as claimed in claim 13.

17. A catalytic reactor for the combustion of at least a part of a fuel-air mixture flowing through the catalytic reactor, the catalytic reactor comprising:

first passages through which flow lean fuel-air mixtures, and second passages through which flow rich fuel-air mixtures;

a first flow-washed flow section (I) free of catalytic coatings;

a second section (II) located downstream of the first section;

a catalytic coating located in the second section (II) in the second passages; and a third section (III) located downstream of the second section;

wherein the third section is free of catalytic coatings in the second passages.

18. The catalytic reactor as claimed in claim 17, comprising:

a catalytic coating located in the third section (II) in the first passages.

* * * * *